United States Patent

Farrington et al.

[11] 3,879,223
[45] Apr. 22, 1975

[54] SEALED PRIMARY SODIUM-HALOGEN CELL

[75] Inventors: Gregory C. Farrington, Clifton Park; Peter C. Lord, Schenectady, both of N.Y.

[73] Assignee: General Electric Company, Schenectady, N.Y.

[22] Filed: Apr. 5, 1974

[21] Appl. No.: 458,089

[52] U.S. Cl. .............................................. 136/83 R
[51] Int. Cl. .......................................... H01m 13/00
[58] Field of Search ............ 136/83 R, 100.20, 6 R, 136/6 LN, 6 FS, 153

[56] References Cited
UNITED STATES PATENTS

| | | | |
|---|---|---|---|
| 3,578,500 | 5/1971 | Marick et al. | 136/83 R |
| 3,703,415 | 11/1972 | Mitoff et al. | 136/83 R |
| 3,730,771 | 5/1973 | Tannenberger et al. | 136/6 R |
| 3,762,955 | 10/1973 | Dubin | 136/83 R |
| 3,773,558 | 11/1973 | Charbonnier et al. | 136/100 R |
| 3,793,080 | 2/1974 | Hess | 136/83 R |
| 3,817,790 | 6/1974 | Mitoff | 136/83 R |

*Primary Examiner*—John H. Mack
*Assistant Examiner*—C. F. Lefevour
*Attorney, Agent, or Firm*—Paul R. Webb, II; Joseph T. Cohen; Jerome C. Squillaro

[57] ABSTRACT

A sealed primary sodium-halogen cell is disclosed which comprises a casing, an anode positioned in the casing, the anode selected from the class consisting of sodium, sodium as an amalgam, and sodium in a non-aqeous electrolyte, a solid sodium ion-conductive electrolyte positioned in the casing adjacent the anode, and a cathode positioned adjacent the opposite side of the electrolyte, the cathode comprising thionyl chloride or thionyl chloride with various other conductivity-enhancing compounds.

3 Claims, 1 Drawing Figure

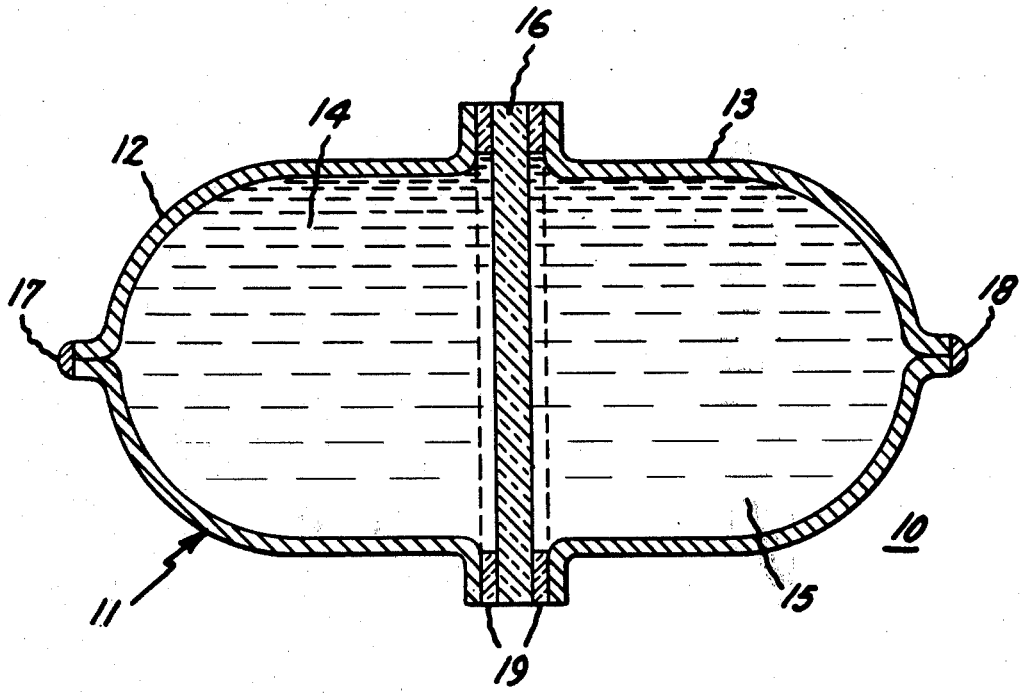

SEALED PRIMARY SODIUM-HALOGEN CELL

This invention relates to sealed primary sodium-halogen cells and, more particularly, to such cells employing a cathode of thionyl chloride alone, or with various other conductivity-enhancing compounds.

Sodium-halogen cells are known in the prior art as, for example, described in Hess U.S. Pat. No. 3,793,080 issued Feb. 19, 1974 under the title "Sealed Primary Sodium-Halogen Battery With Bromine-Iodine Mixture." This patent describes and claims such a battery in which the cathode comprises a mixture of bromine and from 5.0 to 60 weight percent of iodine with specific conductive material, additives or both. The subject patent is assigned to the same assignee as the present application.

An article entitled "Lithium Anode Cells Operating at Room Temperature in Inorganic Electrolytic Solutions" by James J. Auborn et al. appeared on pages 1613-1619 of the "Journal of the Electrochemical Society," Vol. 120, No. 12, Dec., 1973. A study of such cells is reported in the next article in the above Journal volume entitled "Lithium Inorganic Electrolyte Cells Utilizing Solvent Reduction" by Wishvender K. Behl et al. at pages 1619-1623. Thus, a description of the first article would appear to be sufficient to describe the cells therein.

In the above first article, there is described a first cell structure which has a solid cathode of active material, such as $CuF_2$ or $WO_3$, carbon powder, and a binder on a nickel screen. The cathode is sealed in a nonwoven polypropylene envelope and positioned within a lithium anode folded to envelope the cathode on both sides. The lithium anode consists of a nickel screen pressed into a lithium foil. This structure is placed in a rectangular polyethylene jar. An electrolyte is added to complete the cell. The electrolyte consists of a solvent and a solute. The solvent is selected from phosphoryl chloride, $POCl_3$, sulfuryl chloride $SO_2Cl_2$, or thionyl chloride, $SOCl_2$. The solute consists of $AlCl_3$, $AlBr_3$ or $LiAlBr_4$.

A second cell structure is described wherein the arrangement of the elements is similar to the arrangement in the first cell structure. The anode is identical and the woven separator is identical. The electrolyte has the same solvent and solute as the first cell structure. However, it additionally contains a reactant of chlorine or bromine. The cathode has a carbon, platinum or nickel current collector. The reactant for the cathode comprises the chlorine or bromine contained in the electrolyte.

In copending patent application (RD-7356), Ser. No. 458,092, filed Apr. 5, 1974, in the names of Peter C. Lord and Gregory C. Farrington entitled "Sealed Primary Sodium-Halogen Cell," there is described and claimed such a cell wherein the cathode comprises sulfuryl chloride alone, or with aluminum or ferric chloride. This copending application is assigned to the same assignee as the present application.

As opposed to the cell configurations as described in the above first article and the tests described in the above second article, the present invention relates to a primary sodium-halogen cell which has a substantially different structure. The present invention is a sealed cell. Secondly, the anode is selected from the class of sodium, sodium as an amalgam and sodium in a nonaqueous electrolyte. Thirdly, the present invention has an electrolyte of a solid sodium ion-conductive material as opposed to the liquid electrolyte of the above-described cell constructions. Fourthly, the cathode of the present invention comprises thionyl chloride, or thionyl chloride with various other conductivity-enhancing compounds.

In the above described cells, the electrolyte is in contact with both the cathode and the anode. The cathode is surrounded merely by a porous nonwoven envelope. Thus, the sealed primary sodium-halogen cell of the present application is substantially different from the above-described cells. Furthermore, in the above second cell configuration the electrolyte contains chlorine or bromine which liquid reactant comprises the cathode. Since the chloride or bromine is in contact with both the anode and cathode there results a high rate of self-discharge due to the chlorine or bromine dissolved in the electrolyte. Further, there is a chemical interaction with the lithium anode to form the respective lithium bromide or lithium chloride salt. While some of this salt dissolves, more of this salt forms a solid precipitate in the cell.

The primary object of our invention is to provide a primary battery which has a near zero self-discharge rate, high cell voltage and high energy density.

In accordance with one aspect of our invention, a sealed primary sodium-halogen battery comprises a casing, an anode positioned in the casing, the anode selected from the class consisting of sodium, sodium as an amalgam, and sodium in a nonaqueous electrolyte, a solid sodium ion-conductive electrolyte positioned in the casing adjacent the anode, and a cathode positioned adjacent the opposite side of the electrolyte, the cathode only comprising thionyl chloride, $SOCl_2$, or thionyl chloride with various other conductivity-enhancing compounds.

These and various other objects, features and advantages of the invention will be better understood from the following description taken in connection with the accompanying drawing in which:

The single FIGURE is a sectional view of a cell made in accordance with our invention.

In the single FIGURE of the drawing, there is shown generally at 10 a sealed primary sodium-halogen cell embodying our invention which has a metallic casing 11 including an anode portion 12 and a cathode portion 13. An anode 14 of sodium as an amalgam is shown positioned within anode portion 12. A cathode 15 comprising a saturated solution of tetrabutylammonium perchlorate in thionyl chloride is positioned within cathode portion 13. A solid sodium ion-conductive electrolyte 16 is positioned between and adjacent anode 14 and cathode 15. Electrical leads (not shown) are affixed to the respective casing portions. Closed fill tubes 17 and 18 are associated with the respective portions 12 and 13. Electrolyte 16 is secured on opposite sides to portions 12 and 13 by identical glass seals 19.

A sealed primary sodium-halogen cell is formed by providing a metallic casing, providing an anode within the casing, the anode selected from the class consisting of sodium, sodium as an amalgam, and sodium in a nonaqueous electrolyte, providing a solid sodium ionconductive electrolyte adjacent the anode, and providing a cathode adjacent the opposite side of the electrolyte, the cathode only comprising a liquid selected from the class consisting of thionyl chloride, and thionyl chloride with various other conductivity-enhancing compounds. We found that such cells have open circuit voltages in the range of 3.6 to 3.76 volts.

The anode may consist of sodium, a sodium amalgam or sodium in a nonaqueous electrolyte. The sodium amalgam can be in the range of compositions from about 95% sodium and 5% mercury by weight to about 35% sodium and 65% mercury. For the fully charged state of the cell, the amalgam composition is preferably high in sodium. Cells using sodium amalgams cannot be used efficiently at temperatures below 21.5°C due to complete freezing of the amalgam.

The use of nonaqueous electrolytes permits cell operation to much lower temperatures as determined by the freezing point of the electrolyte. A preferred electrolyte is propylene carbonate in which a sodium halide salt is dissolved. This electrolyte permits cell operation down to 0°C.

We found unexpectedly that a suitable cathode for a sealed primary sodium-halogen cell was thionyl chloride, or thionyl chloride with a wide variety of other inorganaic and organic conductivity-enhancing compounds. The cathode is separated from the anode by the solid sodium ion-conductive electrolyte. No cathode material contacts directly the anode material. We found that thionyl chloride, $SOCl_2$, is a vigorous oxidizing agent that tends to be eclipsed by its more potent relative, sulfuryl chloride, $So_2Cl_2$. As opposed to sulfuryl chloride, thionyl chloride can be used with a wide variety of conductivity-enhancing compounds. Thionyl chloride has a higher boiling point and a lower molecular weight than sulfuryl chloride. Of great importance, thionyl chloride is less corrosive and more stable toward decomposition than sulfuryl chloride. When such a cell has a cathode of thionyl chloride and another suitable conductive compound, the cell exhibits an open circuit voltage in the range of 3.5 to 3.75 volts.

We found a wide variety of conductivity-enhancing compounds to be suitable for use as a cathode with thionyl chloride in the above type of cell. Such compounds include tetrabutylammonium perchlorate, tetraethylammonium chloride, tetraethylammonium bromide, tetrabutylammonium fluoroborate, lithium perchlorate, sodium trifluoromethanesulfonate, lithium hexafluorophosphate, sulfolane, acetonitrile, and pyridine.

The anode casing portion can be made of nickel, Kovar alloy, niobium or tantalum, while the cathode casing portion should preferably be niobium or tantalum. These metals have been shown to be chemically stable in their respective environments.

A method of hermetically sealing the anode and cathode portions of the casing to opposite sides of the solid electrolyte is described and claimed in copending patent application Ser. No. 148,793, filed June 1, 1971, under the title "Method of Forming a Metallic Battery Casing" in the name of Stephan P. Mitoff. This copending application is assigned to the same assignee as the present application.

In the above method, a disc of solid sodium ion-conductive electrolyte, for example, sodium betaalumina, has stacked thereon a ring of General Electric Company 1013 glass cut from tubing. The glass ring has approximately the inside and outside diameter of the cup lip of casing portion. On the glass ring is stacked the nickel anode portion is cup form with its lip adjacent the ring. The three components are positioned on a supporting jig and lowered into an inert atmosphere furnace at 1,000°C for about 1 minute. The resulting seal is helium leak-tight. The process is repeated to seal the cathode portion to the opposite surface of the solid electrolyte. Both anode and cathode portions can also be sealed simultaneously to the disc in the above manner.

The anode portion can be filled with sodium, sodium as an amalgam, or sodium in a nonaqueous electrolyte through tube 17 after which the tube is sealed, as for example, by welding. The cathode portion is filled with thionyl chloride, or thionyl chloride with other suitable conductive compounds through tube 18, after which the tube is similarly sealed. The resulting device is a sealed, primary sodium-halogen cell. Leads (not shown) are attached to the respective casing portions for operation of the cell.

Examples of primary sodium-halogen cells made in accordance with our invention are set forth below:

EXAMPLE 1

A vented primary sodium-halogen cell was constructed which employed a glass casing consisting of an anode portion and a cathode portion. A platinum wire extended into each casing portion. The portions were separated by a solid sodium beta-alumina electrolyte disc. The anode portion was filled with a sodium amalgam of a composition of 90 weight percent of sodium and 10 weight percent of mercury as the anode. A saturated solution of tetrabutylammonium perchlorate in thionyl chloride was added only to the cathode portion as the cathode. The resulting device was a primary sodium-halogen cell. An open circuit voltage of 3.76 volts was obtained.

EXAMPLE 2

Another vented primary sodium-halogen cell was constructed which employed a glass casing consisting of an anode portion and a cathode portion. A platinum wire extended into each casing portion. The portions were separated by a solid sodium beta-alumina electrolyte disc. The anode portion was filled with a sodium amalgam of a composition of 90 weight percent sodium and 10 weight percent of mercury as the anode. A solution of 50 volume percent thionyl chloride and 50 volume percent acetonitrile saturated with sodium trifluoromethanesulfonate was added to the cathode portion as the cathode. The resulting device was a primary sodium-halogen cell. An open circuit voltage of 3.53 volts was obtained.

EXAMPLE 3

The cell of Example 1 exhibited at 25°C the following polarization behavior which is shown below in Table I.

TABLE I

| Voltage-Volts | Current Density-$\mu a/cm^2$ |
| --- | --- |
| 3.76 | 0 |
| 3.65 | 1.3 |
| 3.44 | 6.7 |
| 3.25 | 13.3 |
| 3.03 | 26.7 |

EXAMPLE 4

The cell of Example 2 exhibited at 25°C the following polarization behavior which is shown below in Table II.

TABLE II

| Voltage-Volts | Current Density- $\mu a/cm^2$ |
|---|---|
| 3.53 | 0 |
| 3.37 | 1.3 |
| 3.27 | 6.7 |
| 2.91 | 26.7 |
| 2.65 | 53.4 |
| 2.27 | 80.1 |

While other modifications of the invention and variations thereof which may be employed within the scope of the invention have not been described, the invention is intended to include such as may be embraced within the following claims.

What we claim as new and desire to secure by Letters Patent of the United States is:

1. A sealed primary sodium-halogen cell comprising a casing, an anode positioned in the casing, the anode selected from the class consisting of sodium, sodium an amalgam, and sodium in a nonaqueous electrolyte a solid sodium beta-alumina ion-conductive electrolyte positioned in the casing adjacent the anode, and a cathode positioned adjacent the opposite side of the electrolyte, the cathode only comprising a liquid selected from the class consisting of thionyl chloride, and thionyl chloride with conductivity-enhancing compound 2. A sealed primary sodium-halogen cell as in claim 1, in which the cathode is a saturated solution of tetrabutylammonium perchlorate in thionyl chloride.

3. A sealed primary sodium-halogen cell as in claim 1, in which the cathode is 50 volume percent thionyl chloride and 50 volume percent acetonitrile saturated with sodium trifluoromethanesulfonate.

* * * * *